United States Patent [19]

Figol

[11] 4,314,370

[45] Feb. 2, 1982

[54] WIRELESS INTERCOMMUNICATION SYSTEM

[76] Inventor: Georg Figol, No. 28/II, Bingenerstrasse, 8000 München 50, Fed. Rep. of Germany

[21] Appl. No.: 145,914

[22] Filed: May 2, 1980

[30] Foreign Application Priority Data

Nov. 21, 1979 [DE] Fed. Rep. of Germany ....... 2919940
Nov. 21, 1979 [DE] Fed. Rep. of Germany ....... 2946875

[51] Int. Cl.³ .................... H03K 13/22; H04B 9/00
[52] U.S. Cl. .................................. 375/28; 375/49; 455/608; 455/615
[58] Field of Search ................ 332/11 R, 11 D; 340/347 AD; 375/28, 45; 455/608, 615

[56] References Cited

U.S. PATENT DOCUMENTS 3,402,258  9/1968  Lerner ............................ 375/28
3,529,089  9/1970  Davis et al. ..................... 375/28
3,845,293  10/1974 Borner ........................... 455/608

Primary Examiner—Benedict V. Safourek
Attorney, Agent, or Firm—John C. Smith, Jr.

[57] ABSTRACT

An intercommunication system for the wireless transmission of speech, employing ternary delta modulation, wherein, for the purpose of asynchronous ternary delta modulation, the delta modulator and demodulator of each subscriber is connected via a modem to either a radio or optical signal channel, respectively, which is common to all subscribers. The modem sends either two high-frequency or optical carriers, respectively, differing by a frequency shift of Δf to the signal channel only with the +1 or −1 signals, not for the idling state 0, from the delta modulator and is able to receive such carriers from the signal channel in order to decode them as +1 or −1 signals for the delta demodulator.

7 Claims, 7 Drawing Figures

WIRELESS INTERCOMMUNICATION SYSTEM

BACKGROUND OF THE INVENTION

This invention relates to a method of implementing intercommunication systems for wireless transmission of speech with the aid of asynchronous or synchronous ternary delta modulation.

An intercommunication system enables several subscribers to exchange information simultaneously via a common signal channel. The signal channel used is frequently a line. In the line, the audio frequency signals of the participants in the conversation are additively superimposed upon one another.

In order to preserve the mobility of the subscribers, wireless-intercommunication systems have to be used. Due to the interference of the high-frequency carriers, the additive superposition of the audio frequency signals in the signal channel is impractical with the customary modulation methods. In radio telephony, therefore, the simplex method is used in which it must be ensured that only one subscriber is transmitting in each case and the other subscribers are only able to receive at this time.

The output signal of an asynchronous delta modulator is a ternary signal of which the three amplitude values of $-1, 0, +1$ are quantized, but not the repetition frequency. The frequency of occurrence of a $+1$ or a $-1$ signal corresponds to the steepness of the edge of the low-frequency signal applied. A more detailed discussion of asynchronous ternary delta modulation may be found in the book "Delta Modulation Systems" by R. Steele, Pentech Press, London, 1975, ISBN 0727304011, pp. 165-182 and in "Electronic Engineering", Vol. 40, 1968, pp. 32-37. With the probability distributions of the amplitudes and spectrum of human speech the signal probability $p_s$ is only a few percent for the occurrence of a $+1$ or $-1$ signal, depending on the design of the delta modulator and the pitch of the speaking person.

For some applications it is also desirable if such modulators work synchronously. If the decision circuit and the clock-controlled memory of a customary binary synchronous delta modulator are replaced by ternary systems, a ternary synchronous delta modulator is obtained, the output signal of which is similar to that of the asynchronous delta modulator but the output signal of which is synchronized with the clock signal. This represents a special case of the modulator known under the name of "Multilevel Delta Modulator" as described by R. Steele in "Delta Modulation Systems", Pentech Press, London, 1975, pp. 301-323.

SUMMARY OF THE INVENTION

It is the object of the present invention to make it possible to operate a wireless-intercommunication system with the aid of asynchronous ternary delta modulation or synchronous ternary delta modulation without the disadvantages of simplex operation.

According to the present invention, this object is attained by the provision of an intercommunication system for the wireless transmission of speech, employing ternary delta modulation, wherein, the delta modulator and demodulator of each subscriber is connected either by high-frequency or by optical means, respectively, via a modem to either a radio or optical signal channel, respectively, which is common to all subscribers, in which arrangement the modem sends either two high-frequency or optical carriers, respectively, differing by a frequency shift of $\Delta f$ to the signal channel only for the $+1$ or $-1$ signals, not for the idling state 0, from the delta modulator and is able to receive identical carriers from the signal channel in order to decode them as $+1$ or $-1$ signals for the delta demodulator.

This intercommunication system provides for an asynchronous time-division multiplex operation with a calculable interference probability $p_i$ which, however, can be neglected for speech transmission.

In the solution utilizing synchronous ternary delta modulation it is proposed to connect the synchronous ternary delta modulator and demodulator via the same modem to the common signal channel. Despite the lack of synchronization between the signals of the individual subscribers, this intercommunication system provides for an asynchronous time-division multiplex operation with a calculable interference probability $p_i$ which, however, can be neglected for speech transmission.

BRIEF DESCRIPTION OF THE DRAWINGS

Some embodiments of the invention will now be described by way of example and with reference to the accompanying diagrammatic drawings, in which.

DESCRIPTION OF THE PREFERRED EMBODIMENTS

Figure 1:
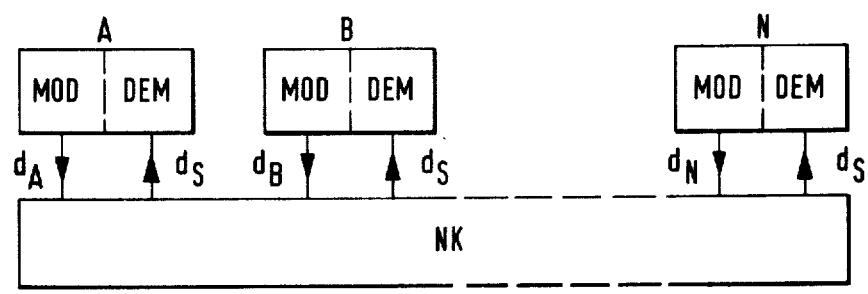
FIG. 1 shows a diagram of a wireless intercommunication system.

First, the possibility of intercommunication operation is explained with the aid of a diagram of an intercommunication system as shown in FIG. 1: Each of the subscribers A, B, . . N is connected with a ternary delta modulator MOD and a ternary delta demodulator DEM via the modem MDM to a common signal channel NK. Each subscriber can send his signal $d_A$, $d_B$, . . $d_N$ via the modem MDM into the common signal channel and receive the sum signal $d_S$ via the modem MDM from the channel. If several signals of the $+1$ or $-1$ type arrive simultaneously in the channel, interference occurs which becomes noticeable by a momentarily increased quantization error in the demodulation of the sum signal $d_S$. The interference probability $p_i$ increases with the number of subscribers speaking at the same time. However, it is always felt to be a natural consequence of several subscribers talking at the same time that the intelligibility will be reduced. Under this assumption, the evaluation of the interference characteristics can be restricted to the case of only two subscribers talking simultaneously. Both subscribers are transmitting respective $+1$ and $-1$ signals with the same signal probability $p_s$, but statistically independently of one another. The interference probability $p_i$ is given by $$p_i = p_s^2.$$

Considering also that in the case of interference an instantaneous error of three levels of quantization can be decoded as "worst case" (for example, two $+1$ signals could be detected as $-1$), it can be seen that duplex operation is possible without any significant loss of intelligibility.

If an asynchronous delta modulator is fed with steep-edged signals a high pulse repetition frequency is produced. This results in a requirement for a transmission band width which is hard to support.

Figure 2:
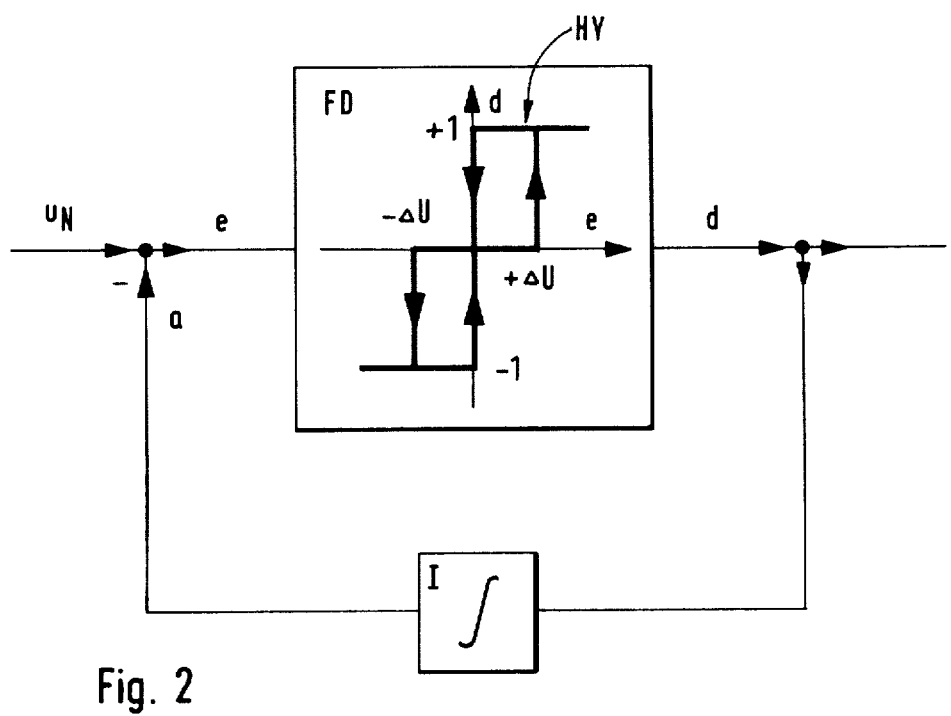
FIG. 2 shows a modulator.

FIG. 2 shows a new modulator, the pulse duration of which is matched to the steepness of the edges of the low-frequency signal, resulting in a lower repetition frequency. The higher the edge steepness, the longer the pulse duration (adaptive asynchronous delta modulation). This prevents the modulation spectrum from being increased significantly without increasing the quantization error e. The adaptive asynchronous delta modulator consists of a non-linear closed loop, the feedback path of which contains an integrator I working as a local demodulator. The forward path is formed by a window discriminator FD which has a dual hysteresis characteristic HY as shown in FIG. 2.

Figure 3:
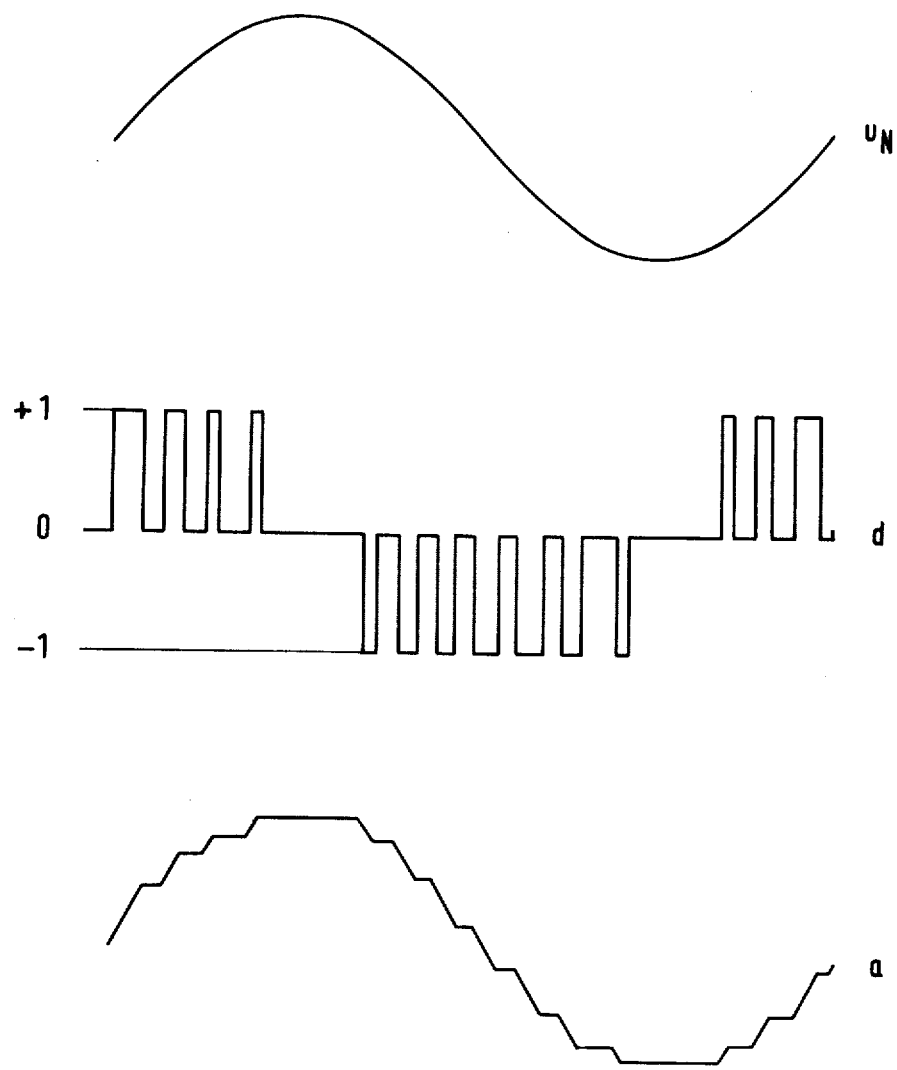
FIG. 3 shows the shapes of the signals.

FIG. 3 shows an example for the signal shapes at the modulator of FIG. 2. The output signal a of the integrator I working as local demodulator is compared with the low-frequency input signal $u_N$ and from this the quantization error e is formed by subtraction. If it exceeds the width $\Delta U$ of the two hysteresis windows, the output signal d of the modulator jumps to the value $+1$ or $-1$. Simultaneously, the integrator I working as local demodulator begins to integrate the output signal d. This process continues (=pulse duration) until the output signal a of the local demodulator has caught up with the low-frequency input signal $u_N$, that is to say until the quantization error e has been compensated for. The window discriminator FD then jumps back to its rest state (d=0).

Figure 4:
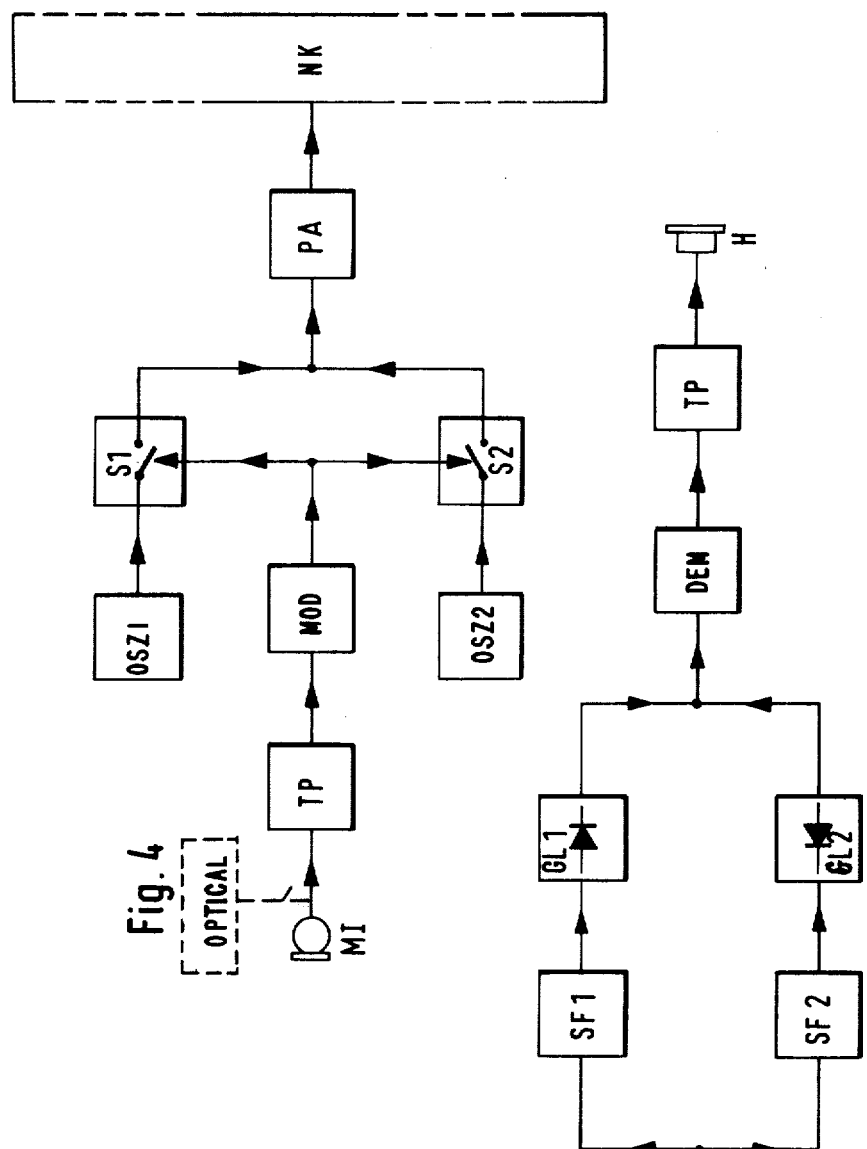
FIGS. 4 and 5 show simplified block diagrams of a radio-intercommunication unit.

FIGS. 2 and 3 show the simplified block diagrams of a radio intercommunication unit. In the transmitter configuration of FIG. 4 the band width of the speech signal supplied by a microphone MI is limited in a low-pass filter TP and fed to a ternary delta modulator MOD. The output signal from the modulator MOD switches two electronic switches S1 and S2 in such a manner that the switch S1 is switched on only for a $+1$ output signal and the switch S2 only for a $-1$ output signal and not for the idling state 0 of the modulator MOD. The two switches connect the carriers, having the frequencies $f+\Delta f/2$ and $f-\Delta f/2$, of oscillators OSZ1 and OSZ2, to a transmitter output stage PA which then transmits them to the signal channel NK.

Figure 5:
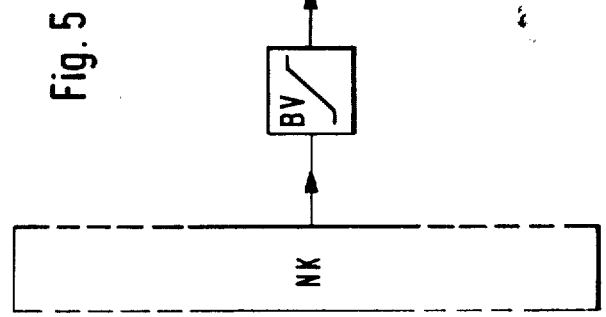

In the receiver configuration of FIG. 5 signals, either from the associated transmitter configuration or from a different subscriber, are received from the signal channel NK and amplified and limited in a limiter amplifier BV. Selective filters SF1 and SF2 select the signals in accordance with their carrier frequency. From these, subsequent rectifier circuits GL1 and GL2 again decode the $+1$ and $-1$ signals of the delta modulation. A response threshold in the rectifier circuits suppresses noise from the signal channel when no signal is being received. The ternary delta modulation is demodulated in the demodulator DEM. The low-frequency signal quantized into stairstep levels is smoothed in the low-pass filter TP before it is supplied to a telephone H.

The feasibility of intercommunication operation has been proved by test equipment implemented in accordance with the principle shown. The devices were attached to a set of headphones equipped with a lip microphone, rendering a manual operation unnecessary during intercommunication operations. They excel themselves by an extremely low power consumption since the transmitter output stage is sampled by the probability $p_s$. During speech intervals, channel noises are completely suppressed by the thresholds of the rectifier circuits.

Figure 6:
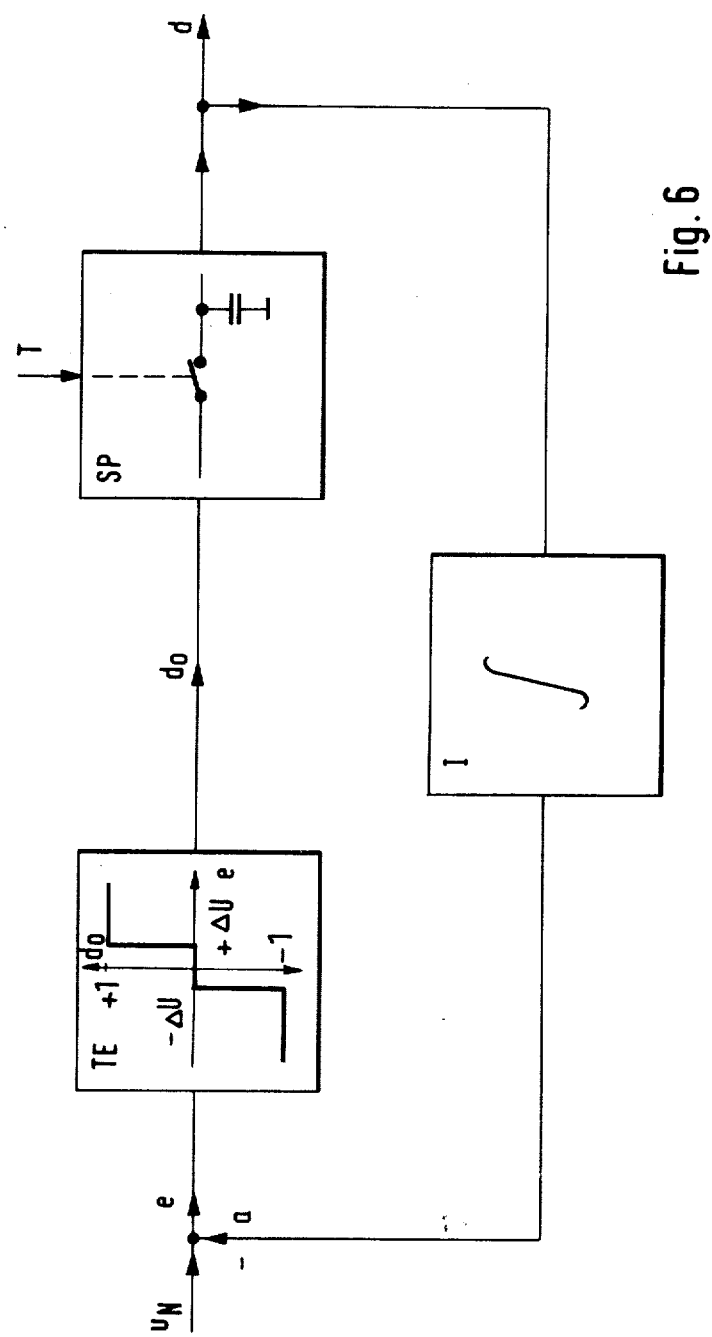
FIG. 6 shows an arrangement containing a synchronous ternary delta modulator.
Figure 7:
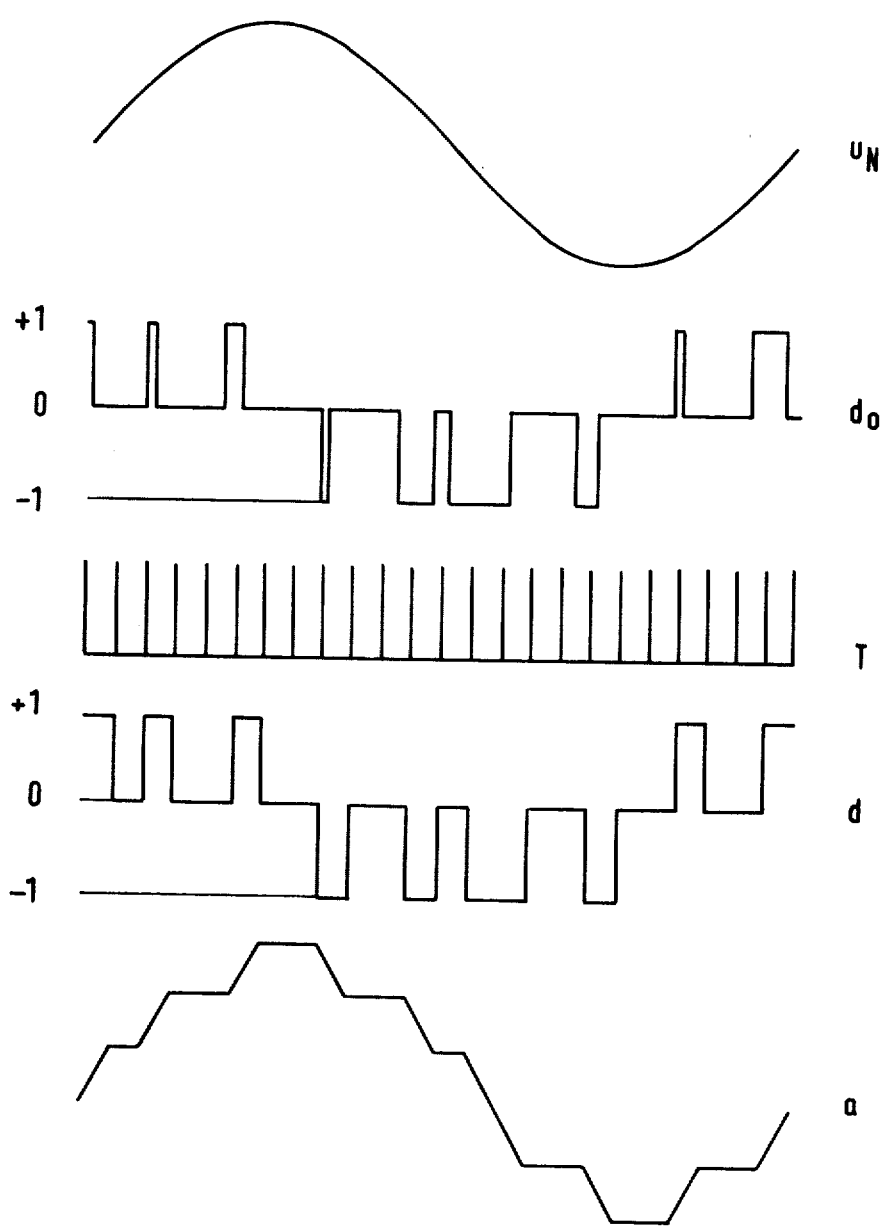
FIG. 7 shows the progress of a signal in FIG. 6.

The operation of a synchronous ternary delta modulator is explained with the aid of FIG. 6: the output signal a of a local delta demodulator is compared with the band width-limited low-frequency speech signal $u_N$ and from this the error signal e is formed. If the error signal exceeds the threshold value $+\Delta U$ of a ternary decision circuit TE, the latter jumps from its rest state 0 to the $-1$ or $+1$ state. The state $d_o$ of the decision circuit is sampled by a storage circuit SP at the clock rate T and stored for the duration of a clock period and provided as signal d at the output of the modulator. FIG. 7 shows an example for the signals occurring at the synchronous ternary delta modulator. If the output signal d of the synchronous ternary delta modulator is compared with the output signal of the asynchronous delta modulator of FIG. 2, it can be seen that the synchronous ternary delta modulator is similarly suited for application in the modem described in Claim 1.

The invention may be embodied in other specific forms without departing from the spirit or essential characteristics thereof. The embodiments are therefore to be considered in all respects as illustrative and not restrictive.

What is claimed is:

1. An intercommunication system for the wireless transmission of speech, employing ternary synchronous or asynchronous delta modulation, wherein, the delta modulator (MDM) and demodulator (DEM) of each subscriber (A, B, . . N) is connected via a modem to either a radio or optical channel (NK), respectively, which is common to all subscribers, in which arrangement the model (MDM) sends either two high-frequency or optical carriers, respectively, differing by a frequency shift of $\Delta f$ to the common signal channel (NK) only for $+1$ or $-1$ signals, not for the idling state 0, from the delta modulator (MOD) and is able to receive such carriers from the common signal channel (NK) in order to decode them as $+1$ or $-1$ signals for the delta demodulator (DEM).

2. An intercommunication system as claimed in claim 1, wherein the delta modulator and demodulator of each subscriber is connected by high-frequency means via the modem to the signal channel (NK).

3. An intercommunication system as claimed in claim 1, wherein the delta modulator and demodulator of each subscriber is connected by optical means via the modem to the signal channel (NK).

4. An intercommunication system as claimed in claim 1, wherein the two carriers are high-frequency carriers.

5. An intercommunication system as claimed in claim 1, wherein the two carriers are optical carriers.

6. An intercommunication system as claimed in claim 1, wherein a window discriminator (FD) having a dual hysteresis characteristic (HY) is used in the forward path of the closed loop of the asynchronous delta modulator (MOD).

7. An intercommunication system as claimed in claim 1 for the wireless transmission of speech by means of synchronous ternary delta modulation, wherein the modem is connected to the common signal channel.

* * * * *